July 27, 1943.  A. F. GEORGES  2,325,502
SPEED VARYING DEVICE
Filed March 8, 1941  2 Sheets-Sheet 2
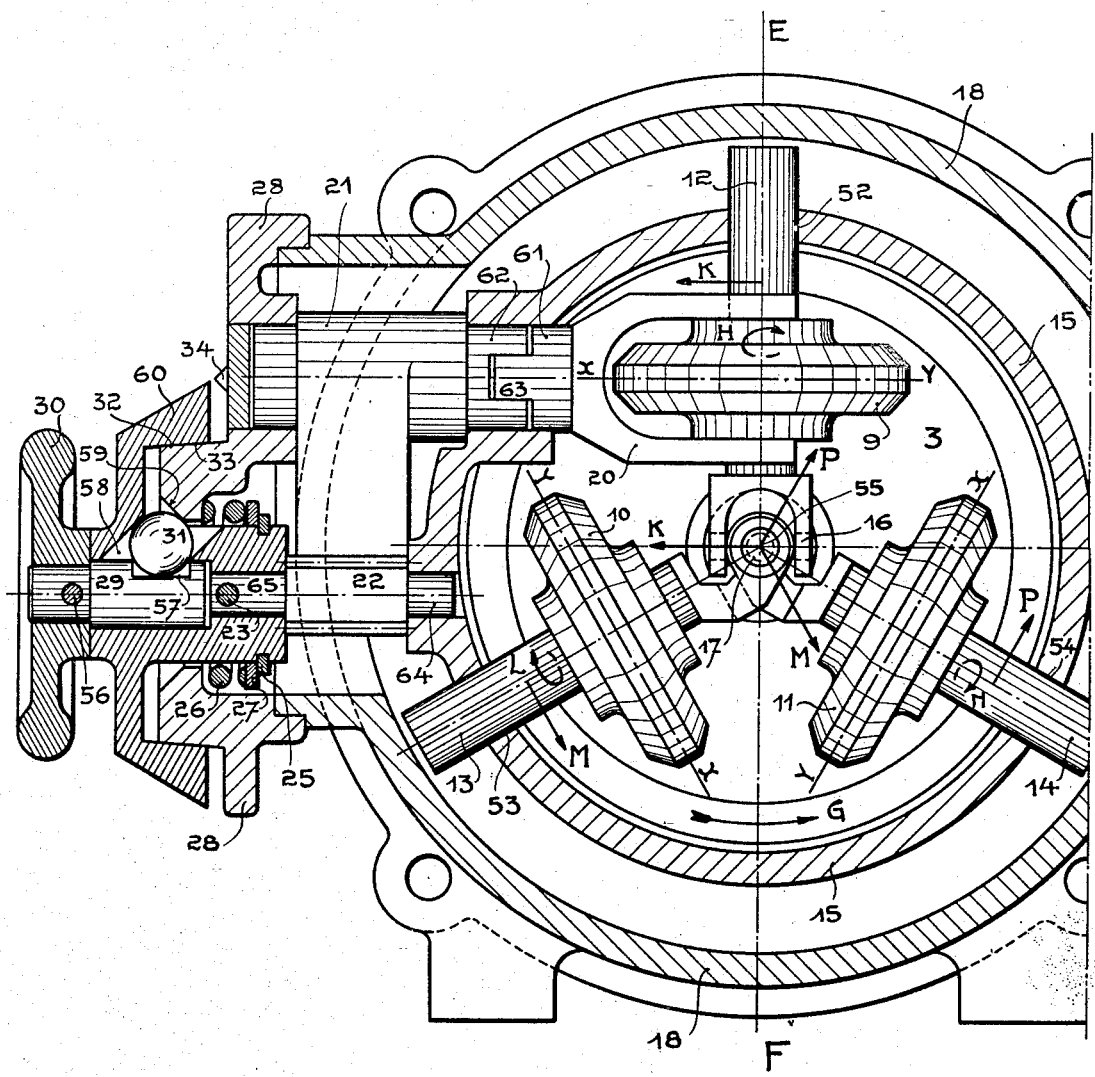
Fig: 2
Fig: 3
Auguste Felix Georges
By
Watson, Cole, Grindle & Watson
Attys.

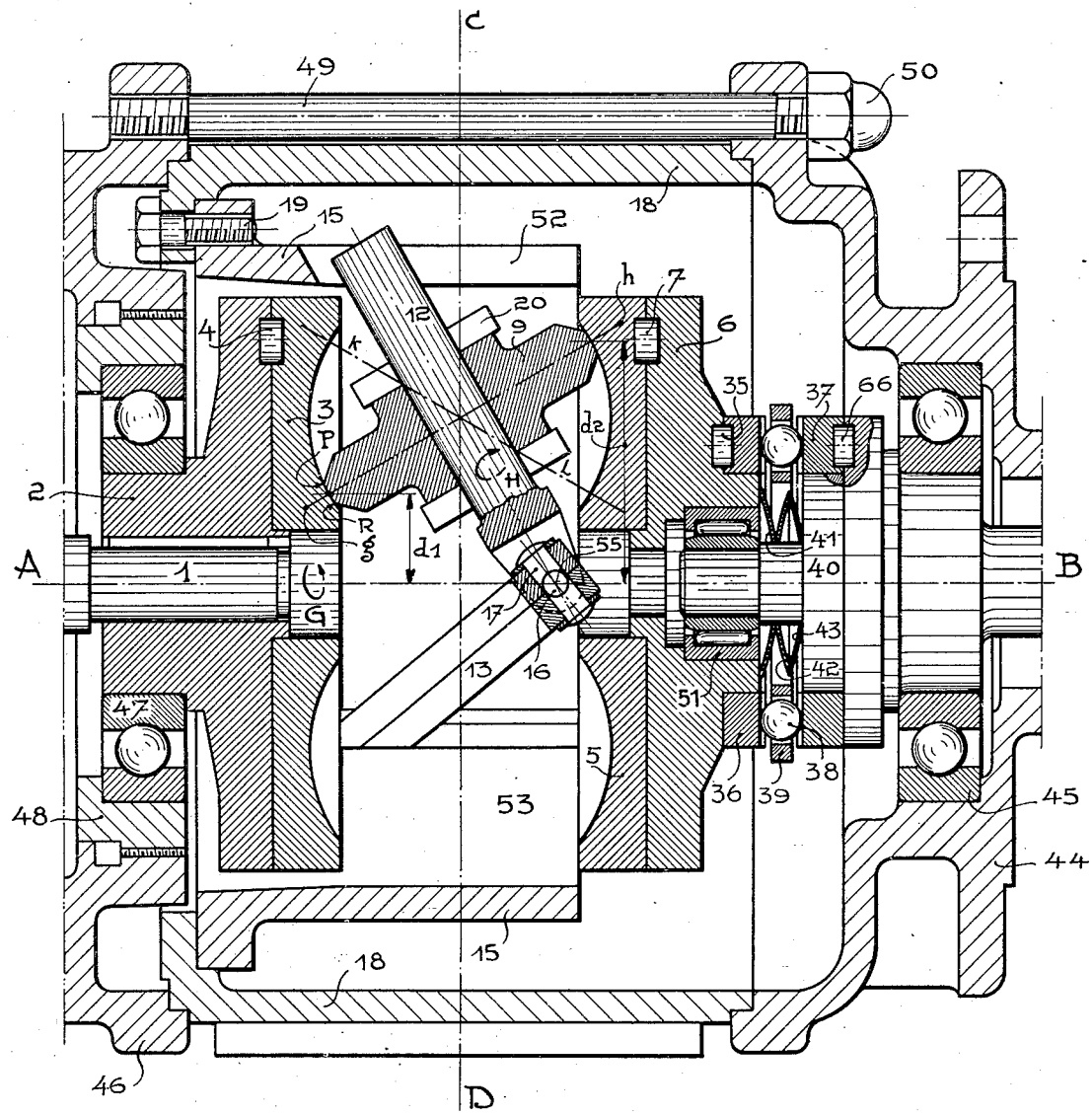
Fig:1

UNITED STATES PATENT OFFICE 2,325,502

SPEED VARYING DEVICE

Auguste Félix Georges, Uccle-Brussels, Belgium;
vested in the Alien Property Custodian Application March 8, 1941, Serial No. 382,419
In Belgium March 8, 1940

8 Claims. (Cl. 74—200)

My present invention relates to speed-varying devices. Its object is to provide a speed-varying device for imparting to a driven shaft any speed within a continuous and progressive range of starting from the constant speed of a driving shaft, this result being attained in such a way that the transmitted forces are equally and automatically distributed over the power transmission members.

With that end in view, the speed-varying device according to the invention is characterized in that it comprises rollers having their shafts connected to one another at one of their ends in a common linking joint, while their other end slides freely in grooves or guides.

In one practical embodiment of the invention these rollers are preferably three in number. In addition, the linking joint common to the ends of the roller shafts can move freely in the space. Each roller can rotate freely about its shaft, while the latter can also move freely along its axis within the roller.

Each roller engages two annular surfaces produced by the revolution of a portion of a circumference about the axis of the driving and driven shafts and operatively connected with them. Said annular surfaces embrace the rollers under the pressure of springs. The effect of this pressure is made to vary in the ratio of the resisting torque of the driven shaft by the shifting of balls between converging surfaces operatively connected on one hand to the driven shaft and on the other hand to a head on which the annular surface corresponding to said driven shaft is secured.

The rollers are caused to shift between two annular surfaces by the controlling device of the shaft of one of them. Said controlling device comprises a pivoting sector moved by a pinion rotated by means of a controlling hand wheel. An automatic locking and unlocking contrivance for said controlling device of the shaft of one of said rollers comprises a ball engaged in a hole of a disk and acting upon an inclined plane of a cover of said contrivance so as to push backwards said disk during the control, whereby two conical locking surfaces operatively connected respectively to the disk and the cover are separated from one another.

In order that the invention may be well understood an embodiment of the same will now be described by the way of an example, with reference to the accompanying drawings in which:

Figure 1 is a section along plane E—F of Figure 2, one of the rollers being shown with its greatest inclination in one direction and the second of the three rollers being indicated only by means of its shaft.

Figure 2 is a section along plane C—D of Figure 1, the three rollers being shown in their middle position with their shafts perpendicular to the rotation axis A—B of the driving and driven shafts.

Figure 3 is a partial flat development view of the periphery of the connecting device between the driven shaft and the disk upon which the annular surface corresponding to said driven shaft is secured.

As shown in the drawings, a constant-speed driving shaft 1 (Figure 1) is keyed into a driving head 2, to which is secured, by means of spigots 4, a driving disk 3 provided with a circular groove. The latter is produced by the revolution of an arc of a circle of suitable radius about the axis A—B.

A driven head 6 is secured by means of spigots 7 to a receiving disk 5 provided with a circular groove identical to the groove of disk 3.

Disk 3 drives disk 5 through rollers 9, 10 and 11. The radius of these rollers is equal to the radius of the generating arc of the grooves in disks 3 and 5, so that when oscillating about their axis X—Y said rollers 9, 10 and 11 remain steadily in contact with disks 3 and 5.

The driven head 6 is mounted upon a driven shaft 40 by means of a needle bearing 51 allowing a relative movement of head 6 with respect to shaft 40 along the axis A—B.

A series of resilient washers 41, 42 and 43 bearing against a shoulder of the driven shaft 40, bias plate 6 towards plate 2 and keep thus disks 5 and 3 in engagement at a constant pressure with rollers 9, 10 and 11.

Head 6 and the driven shaft 40 have abutments 36 and 37 respectively, which are operatively connected thereto by means of spigots 35 and 66.

Abutments 36 and 37 have an equal number of inclined planes in radial relationship, facing each other and converging as shown on Figure 3. Between these inclined planes are located balls 38 maintained inside of a cage 39.

Driving head 2 rotates in a ball bearing 47 maintained in a head-cover 46 by means of a threaded cup 48, which allows controlling the position of head 2 along the axis A—B.

The driven shaft 40 rotates in a ball bearing 45 secured in a head-cover 44.

The head-covers 46 and 44 fit upon the respective ends of a body 18 and are clamped thereto by means of studbolts 49 and nuts 50.

Rollers 9, 10 and 11 rotate respectively upon shafts 12, 13 and 14, one end of each shaft sliding freely in one of the three grooves 52, 53 and 54 milled in a crown 15 secured by means of screws 19 upon the body 18. At their other ends, said three shafts 12, 13 and 14 are connected to one another by means of a double linking joint around the axes 16 and 17, with point 55 as a free swiveling center.

A member 20 (Figure 2) has one of its ends shaped as a fork both prongs of which embrace shaft 12 on either side of roller 9. At its other end said member 20 is provided with a cylindrical trunnion 61 adapted to rotate, with some clearance, in a bore 62, provided in crown 15. A flat projection 63 of member 20 fits into a corresponding groove cut at one end of the shaft of the toothed sector 21, while the other end of said shaft can pivot in a hollow of cover 28 secured in the body 18. The toothed sector 21 meshes with a pinion 22 having its trunnion 64 journaled in a bore of crown 15 and its cylindrical end 65 secured by means of a pin 23, in the hub of disk 24.

Cover 28 comprises an exterior conical portion 33 on which the interior conical surface 32 of disk 24 is normally maintained by means of a spring 26; the latter presses on one hand upon an interior face of cover 28 and on the other hand upon a washer 27 and a checking ring 25 secured upon the hub of disk 24. In said hub there is freely mounted a cylindrical shaft 29 provided with a flat face 57 and on the end of which a hand wheel 30 is secured by means of a pin 56.

In a cylindrical slanting hole 58 bored in the hub of disk 24 is placed a ball 31 pressing on one hand upon the flat face 57 of shaft 29 and on the other hand upon an inclined circular plane 59 of cover 28.

Disk 24 is provided on its periphery 60 with a scale the marks of which cooperate with a fixed pointer 34 to show the position of rollers 9, 10 and 11 or the speed of the driven shaft 40.

The speed-varying device operates as follows:

For the sake of simplifying the preliminary explanation of the principle involved in the operation of the device, it will be assumed that the apparatus comprises one single roller, say roller 9.

Head 2 and disk 3 supported by it are driven by the driving shaft 1 at a constant speed designated by $v^1$. As roller 9 contacts with disk 3 and disk 5 the latter is driven at a speed $$v^2 = v^1 \frac{d^1}{d^2}$$

(Figure 1), $d^1$ being, with respect to the axis A—B the radius of the circumference along which said roller 9 engages disk 5. If roller 9 is caused to rotate about its axis X—Y (Figure 2) the ratio $$\frac{d^1}{d^2}$$

and consequently the speed $v^2$ vary continuously. Assuming that $d^1=1$ and $d^2=3$ in one extreme position $g$—$h$ (Figure 1) of roller 9, then $v^2$ will be equal to $$v^1 \times \frac{1}{3}$$

When roller 9 is in its extreme position $k$—$l$, then $$v^2 = v^1 \times \frac{3}{1}$$

The ratio between the extreme speeds of disk 5 will then be equal to 9. Between the extreme values $$\frac{v^1}{3}$$

and $v \times 3$ the speed $v^2$ of disk 5 can thus have a continuous series of intermediate values.

The speed-varying device as disclosed hereinbefore allows the transmission of the torque without skidding of the members contacting with one another.

To facilitate the explanation it will again be assumed that only roller 9 is operating.

At the moment the driving shaft 1 is rotated, roller 9 should be in contact with the disks 3 and 5 in order to transmit the movement to the driven shaft 40. Said contact is brought about by the resilient washers 41, 42 and 43 tending to move head 6 towards head 2, the latter being adjusted in a fixed correct position with respect to axis A—B by means of the threaded cup 48. The constant pressure applied by the washers 41, 42 and 43 is sufficient to insure the drive of the driven shaft running idle. As soon as said driven shaft 40 is loaded, the pressure between roller 9 and disks 3 and 5 should be greater; this pressure must be proportional to the load in order to avoid slipping, whatever the load may be. Automatic control of the pressure proportionally to the load is brought about by the displacement of the balls 38 between the inclined planes of the abutments 36 and 37 operatively connected respectively to head 6 and to driven shaft 40. Any reaction upon shaft 40 causes a displacement of balls 38 around the axis A—B. Due to the presence of inclined planes in abutments 36 and 37 the displacement of balls 38 around the axis A—B causes head 6 to move towards head 2 and applies a corresponding pressure upon roller 9. This pressure increases with the load upon shaft 40.

Referring to the transmission of power from driving disk 3 to driven disk 5, the same is a function of the contacting surface of roller 9 with these disks and of the pressure applied upon the contacting surfaces. As previously stated, the pressure applied is proportional to the load upon the driven shaft 40. On the other hand, considering the contacting line P—R (Figure 1) of roller 9 with disk 3, the peripheric speed at points P and R is identical for the roller but different for the disk. This difference in speed causes skidding and hence losses at the points considered, which skidding will be proportional to the distance between the points P and R. Therefore, in order to increase the transmissible power it is of advantage to use a plurality of rollers.

According to this invention, use is made of three rollers 9, 10 and 11, having the same diameter and preferably spaced at 120° from one another, said rollers assuring constantly a perfect contact and a perfect balance between the five members: driving disk 3, driven disk 5 and rollers 9, 10 and 11.

With one or two rollers only, the system would not be balanced and bending forces would be applied to the driving shaft 1 and driven shaft 40.

With four rollers or more, if the parts are not machined with a very high degree of accuracy, it might happen that one or more rollers would not contact with disks 3 and 5 and would play no part in the transmission of forces.

As to the control of the rollers, in order to vary the speed of the driven disk 5, the inclination of rollers 9, 10 and 11 should be varied in the same direction and to the same extent. This simultaneous control is very readily brought about in accordance with this invention by acting directly by means of fork 20 (Figure 2) upon the shaft of one single roller, as for instance upon shaft 12 of roller 9.

As shaft 12 is linked to shafts 13 and 14 by a common linking joint, it transmits to those shafts all its displacements.

If the fork 20 is rotated about its axis, the shaft 12 is rocked, which in turn causes roller 9 to oscillate about its axis X—Y. One end of shaft 12 moves in the groove 52 while its other end moves at the same time in the reverse direction and carries with it, because of the common linking joint 55, both other shafts 13 and 14.

The latter carry, respectively, the rollers 10 and 11 and cause them to oscillate about their axes X—Y to the same extent as roller 9. The free ends of shafts 13 and 14 slide, respectively, in the grooves 53 and 54 in the same direction and to the same extent as the corresponding end of shaft 12 slides in the groove 52.

The axis X—Y of rollers 9, 10 and 11 can not move because the rollers are retained on one hand between the circular grooves of disks 3 and 5 and on the other hand by shafts 12, 13 and 14 respectively, guided by the grooves 52, 53 and 54 and bearing upon one another in the linking joint 55. As a result, at the same time rollers 9, 10 and 11 oscillate about their axis X—Y, shafts 12, 13 and 14 slide in the bore of said rollers 9, 10 and 11 and in the grooves 52, 53 and 54 along their longitudinal axis, the common linking center 55 of said shafts 12, 13 and 14 moving along this axis A—B.

The fork 20, which serves to oscillate the rollers is controlled by the toothed sector 21 driven by pinion 22. To rotate said pinion 22, the hand wheel 30 is acted upon and the movement is transmitted therefrom as follows:

By turning the hand wheel 30 shaft 29 is rotated by means of pin 56. Consequently the ball 31 is pushed outwardly in the inclined hole 58 by the camming action of the flat face 57 of shaft 29 during the initial slight rotation of the shaft 29 relative to disc 24, and the ball 31 pushes upon the inclined plane 59 of cover 28, compresses spring 26, disengages from one another the conical portions 32 and 33 of disk 24 and cover 28 respectively and carries the disc 24 along in the same movement of rotation as hand wheel 30, thus rotating the pinion 22 secured in hub of disk 24 by the pin 23.

As soon the hand wheel 30 is released, spring 26 causes ball 31 to return to its starting position, the conical parts 33 and 32 to engage each other and the whole controlling system is locked.

Unlocking and locking always take place whatever the direction of the rotation and the position of the hand wheel may be, when one starts or stops acting upon the latter.

Finally, the synchronisation of the speed of the three rollers takes place automatically in this speed-varying device. Indeed, if the linking center 55 of the three shafts 12, 13 and 14 is located exactly on the axis A—B these three shafts 12, 13 and 14, and consequently the three rollers 9, 10 and 11 they guide, will have exactly the same inclination with respect to said axis A—B; they will all three be driven at the same speed by the driving disk 3; the three rollers will partake exactly in the same ratio of transmission of the forces; there will be no skidding of the rollers with respect to driving disk 3 and driven disk 5 and the efficiency of the power transmission will be at its maximum.

When the driving disk 3 rotates in the direction of arrow G (Figures 1 and 2) roller 9 will rotate in the direction of arrow H. As on the other hand roller 9 is in contact with the driven disk 5 driven by it, the resistance of said disk will tend to displace roller 9 and consequently shaft 12, which guides it and also the linking point 55 of said shaft in the direction of arrow K (Figure 2).

The same explanation applies to roller 10, which rotates in the direction of arrow L and tends to move along its shaft 13 and the swiveling point 55 in the direction of arrow M as well as to roller 11 which rotates in the direction of arrow N and tends to move along its shaft 14 and the linking center 55 in the direction of arrow P.

Assuming that for any reason the linking center 55 of the three shafts 12, 13 and 14 is not the axis A—B, said shafts 12, 13 and 14 will have different inclinations with respect to the axis A—B and the driving disk 3. The rollers will thus be driven at different speeds, the reactions in the direction of K, M and P will differ from one another. As these reactions are applied at the same point 55 they tend to balance each other by bringing back upon the axis A—B said linking center 55, thus automatically bringing about an equal load upon the three rollers and ideal operating conditions.

This arrangement has many advantages. It allows an equal and automatic distribution of forces upon the three rollers. As a result the efficiency of the transmission is at its maximum, without any skidding of the rollers with respect to the disks and consequently with the minimum wear of the members.

This device makes it possible to vary the obliquity of the rollers and consequently the speed of the driven shaft by acting directly upon the axis of one single roller. The control is thus greatly simplified by eliminating the complications which would surround the direct and simultaneous control of the three rollers.

Finally by this novel control of the shaft of one of the rollers the automatic locking and unlocking of said control is brought about in any position and direction.

What I claim is:

1. A speed-varying device comprising a driving shaft having a head secured thereto and carrying a disk at its driving end, a driven shaft having a head secured thereto and carrying a disk at its driven end and a plurality of rollers engaging said disks and having their shafts connected to one another at one of their ends by a common linking joint, the other ends of the roller shafts sliding freely in guiding grooves.

2. A speed-varying device comprising a driving shaft having a head secured thereto and carrying a disk at its driving end, a driven shaft having a head secured thereto and carrying a disk at its driven end and three rollers engaging said disks and having their shafts connected to one another at one of their ends by a common linking joint, the other ends of the roller shafts sliding greely in guiding grooves.

3. A speed-varying device comprising a driving shaft having a head secured thereto and carrying a disk at its driving end, a driven shaft having a head secured thereto and carrying a disk at its driven end and three rollers engaging said disks and having their shafts connected to one another at one of their ends by a common linking joint adapted to move freely in the space, the other ends of the roller shafts sliding freely in guiding grooves.

4. A speed-varying device comprising a driving shaft having a head secured thereto and carrying a disk at its driving end, a driven shaft having a head secured thereto and carrying a disk at its driven end and three rollers engaging said disks and having their shafts connected to one another at one of their ends by a common linking joint adapted to move freely in the space, the other ends of the roller shafts sliding freely in guiding grooves and each roller being adapted to rotate freely upon its shaft and the latter being adapted to slide freely along its axis within the roller.

5. A speed-varying device comprising a driving shaft having a head secured thereto and carrying a disk at its driving end, a driven shaft having a head secured thereto and carrying a disk at its driven end and three rollers engaging two annular surfaces produced by the rotation of a portion of a circumference about the axis of the driving and driven shafts in said disks and having their shafts connected to one another at one of their ends by a common linking joint adapted to move freely in the space, the other ends of the roller shafts sliding freely in guiding grooves and each roller being adapted to rotate freely upon its shaft and the latter being adapted to slide freely along its axis within the roller.

6. A speed-varying device comprising a driving shaft having a head secured thereto and carrying a disk at its driving end, a driven shaft having a head secured thereto and carrying a disk at its driven end and three rollers engaging, under the pressure of springs, two annular surfaces produced by the rotation of a portion of a circumference about the axis of the driving and driven shafts in said disks and having their shafts connected to one another at one of their ends by a common linking joint adapted to move freely in the space, the other ends of the roller shafts sliding freely in guiding grooves and each roller being adapted to rotate freely upon its shaft and the latter being adapted to slide freely along its axis within the roller.

7. A controlling device for varying the pressure between the disks and rollers of the speed-varying device according to claim 6, in proportion to the resisting torque of the driven shaft, said controlling device comprising balls, adapted to shift between two circular converging surfaces operatively connected on one hand to the driven shaft and on the other hand to the disk carried by said driven shaft.

8. In a device according to claim 6, means for controlling the movements of said roller shafts in said guiding grooves, comprising a fork engaging one of said shafts, said fork being rotatable about an axis intersecting at right angles the axis of said shaft, and manually operable means operatively connected to said fork for rotating the same.

AUGUSTE FELIX GEORGES.